United States Patent
Zeira et al.

(10) Patent No.: US 7,197,289 B2
(45) Date of Patent: Mar. 27, 2007

(54) AUTOMATIC GAIN CONTROL FOR A WIRELESS TRANSMIT/RECEIVE UNIT IN A TIME SLOTTED DATA TRANSMISSIONS

(75) Inventors: Eldad Zeira, Huntington, NY (US); Mihaela Beluri, Glen Cove, NY (US); Robert Lind Olesen, Huntington, NY (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 603 days.

(21) Appl. No.: 10/613,463

(22) Filed: Jul. 3, 2003

(65) Prior Publication Data

US 2004/0176054 A1  Sep. 9, 2004

Related U.S. Application Data

(60) Provisional application No. 60/452,441, filed on Mar. 6, 2003.

(51) Int. Cl.
  *H04B 1/06*  (2006.01)
(52) U.S. Cl. ............................. 455/234.1; 375/345
(58) Field of Classification Search ............. 455/67.11, 455/226.1, 226.2, 232.1, 234.1, 234.2, 249.1, 455/250.1; 375/345; 330/278, 289; 370/321, 370/337, 345, 347
See application file for complete search history.

(56) References Cited

U.S. PATENT DOCUMENTS

| | | | |
|---|---|---|---|
| 6,151,178 A * | 11/2000 | Glover | 360/46 |
| 6,563,891 B1 * | 5/2003 | Eriksson et al. | 375/345 |
| 6,868,263 B2 * | 3/2005 | Filipovic | 455/245.1 |
| 6,873,833 B2 * | 3/2005 | Yang et al. | 455/232.1 |

* cited by examiner

*Primary Examiner*—Quochien B. Vuong
(74) *Attorney, Agent, or Firm*—Volpe and Koenig, P.C.

(57) ABSTRACT

A system and method for automatic gain control for a wireless transmit and receive unit in a time-slotted communications system includes initializing an automatic gain control loop, sampling a received signal, and estimating the power of the received signal. The estimated power of the received signal is compared with a reference power level and an error signal is generated based upon the difference between the estimated power and the reference power level. The error signals generated by a plurality of received signals are accumulated in an accumulator, and the value of the accumulator is looked up in a table to locate a control word for an attenuator. The control word is then passed to the attenuator to adjust the gain.

23 Claims, 5 Drawing Sheets

# AUTOMATIC GAIN CONTROL FOR A WIRELESS TRANSMIT/RECEIVE UNIT IN A TIME SLOTTED DATA TRANSMISSIONS

CROSS REFERENCE TO RELATED APPLICATIONS

This application claims priority from U.S. Provisional Patent Application No. 60/452,441, filed Mar. 6, 2003, which is incorporated by reference as if fully set forth herein.

FIELD OF INVENTION

The present invention relates to gain control in a user equipment, such as a wireless transmit and receive unit (WTRU), in a telecommunications system. More particularly, the present invention relates to an automatic gain control mechanism for use in time-slotted transmissions.

BACKGROUND

The typical automatic gain control (AGC) loop for a WTRU operates on continuous data streams. For time-slotted transmissions, AGC loops require a preamble field or pilot symbols prior to the data field of the slot in order to calculate the gain. The typical AGC loop takes several slots to adjust, and therefore slot-to-slot variations will typically necessitate having a wide dynamic range receiver. If the receiver has insufficient dynamic range to adjust or otherwise fails to adjust, the receiver saturates, or starves, with a high likelihood of causing a high block error ratio (BLER).

SUMMARY

In accordance with the present invention, AGC in a time slotted communications system is performed by initializing a slot within a predetermined range and determining if the slot has an active status' for a first time after a predetermined event, such as a cell handover of a WTRU. In the case of the initialized slot having an active status for a first time after the event, a setting for an accumulator is established corresponding to a previous value. In the case of the initialized slot not having an active status for a first time after the event, the accumulator is initialized to either a value at the end of the slot of a previous frame or a predetermined small initial gain value. The gain is then set.

An AGC for a WTRU in a time-slotted communications system includes initializing an AGC loop, sampling a received signal, and estimating the power of the received signal. The estimated power of the received signal is compared with a reference power level and an error signal is generated based upon the difference between the estimated power and the reference power level. The error signals generated by a plurality of received signals are accumulated in an accumulator, and the value of the accumulator is looked up in a table to locate a control word for an attenuator. The control word is then passed to the attenuator to adjust the gain.

According to a particular aspect of the invention, the gain is taken as an initial value and an initial iteration is established. Samples are quantized and provided as a main loop output. An iteration count is used to determine whether to perform a loop of a power estimation, setting of gain, and incrementing the iteration count or, in the case of the iteration count not less than the iteration value, applying gain for samples of the slot, quantizing the gain, and providing the quantized data to an AGC loop output.

The present invention allows operation of the AGC loop in time slots with no preamble or pilot symbols present.

DETAILED DESCRIPTION OF THE PREFERRED EMBODIMENTS

The present invention will be described with reference to the drawing figures wherein like numerals represent like elements throughout. Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point, or other interfacing device in a wireless environment.

Figure 1A:
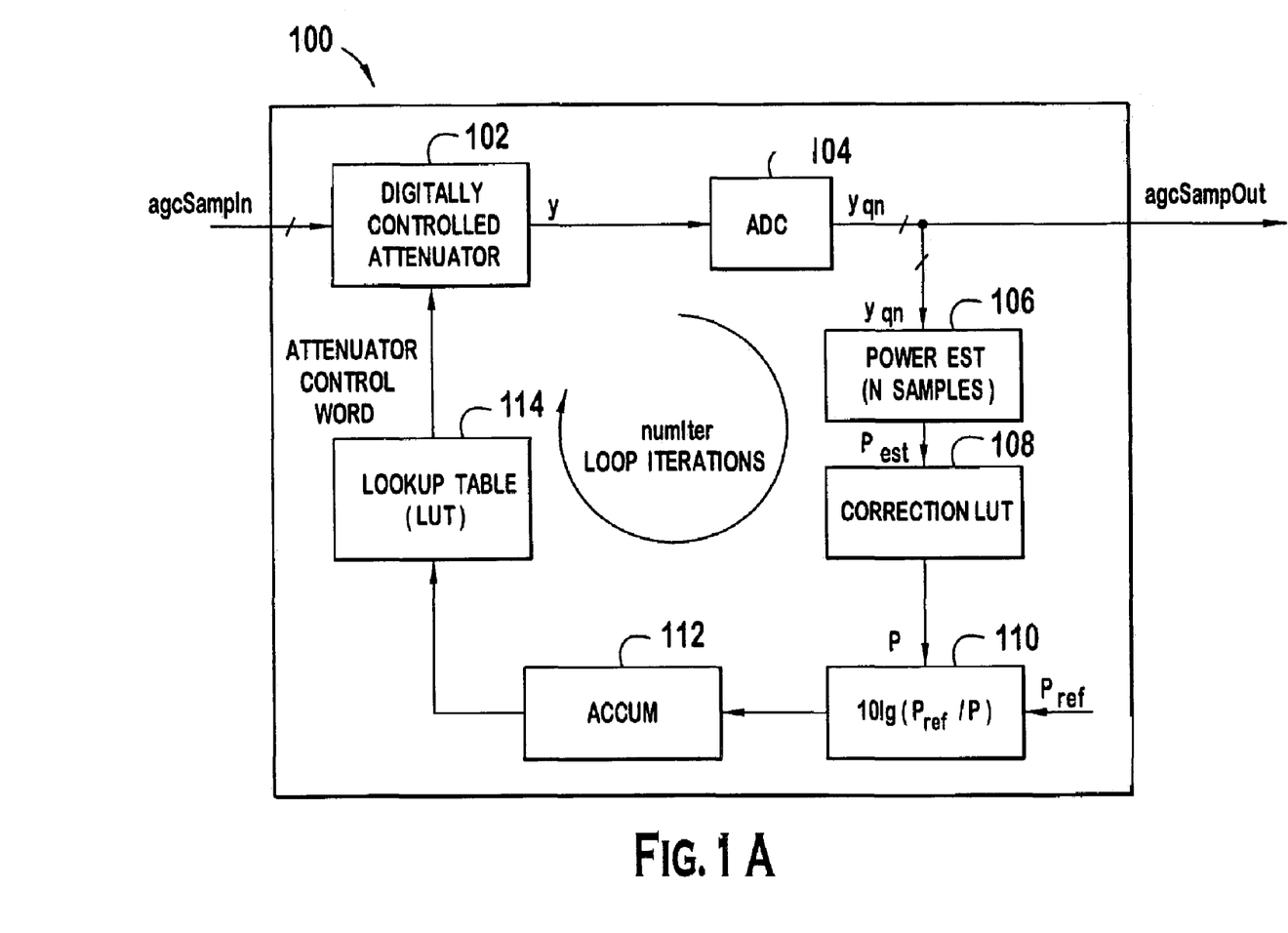
FIG. 1A is a block diagram of the WTRU AGC loop of the present invention.
Figure 1B:
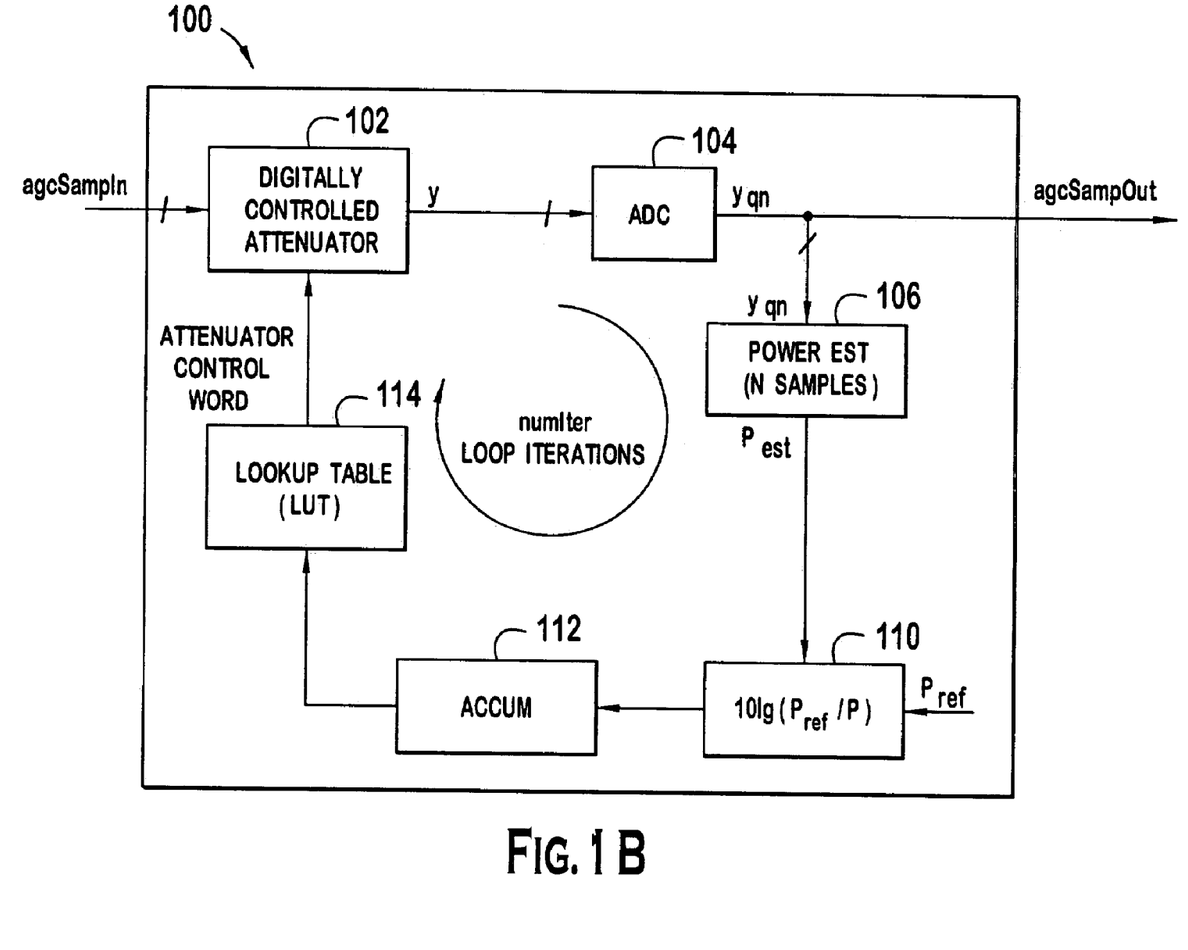
FIG. 1B is a block diagram of an alternate embodiment of the AGC loop shown in FIG. 1A.

FIGS. 1A and 1B illustrate two exemplary embodiments of the present invention; these embodiments are similar, with one exception that is noted below. An AGC loop 100 constructed in accordance with the present invention includes a digitally controlled attenuator 102, an analog-to-digital converter (ADC) 104, a power estimation block 106, an optional correction lookup table 108 (shown in FIG. 1A, but not in FIG. 1B), a comparator 110, an accumulator 112, and a lookup table 114.

For simplicity in describing the present invention, it has been assumed that the total gain of the RF chain has been applied to the received signal and is reflected in the values of the agcSampIn signal at the input of the AGC loop 100. It has also been assumed that the RF chain is designed to provide a specified signal level at the input of the ADC-104, for zero attenuator setting. Further, it is assumed that the process operates after slot and chip timing have been acquired. Slot timing may be provided by cell search functionality. According to one aspect of the invention, acquisition of chip timing is not necessary for the operation of the AGC loop 100.

The present invention presents a steady-state AGC process. Slot timing is significant because the loop 100 presumes that adjustments must happen at the beginning of the slot. Chip timing information usually precedes slot timing information, but is not necessary for this process. Additionally, accurate chip timing is not necessary prior to activation of the process because all that is needed is rough information to indicate the beginning of the slot.

In systems employing the Time Division Duplex (TDD) or the Time Division Synchronous Code Division Multiple Access (TD-SCDMA) techniques, there is a potentially large slot-to-slot variation of received power. Thus, the present invention will be described as slot-based, in that initialization is performed at the beginning of each slot. Thereafter, during a short learning period (i.e., one or more iterations of the closed loop), the gain is adjusted. At the end of the learning period, the loop is opened and the previously adjusted gain is held for the rest of the slot. It is desired to keep the number of loop iterations (labeled as numIter in FIGS. 1A and 1B) as small as possible.

The reason for minimizing the number of loop iterations is that the AGC loop 100 must converge quickly. In selecting a duration within which the loop 100 converges, it is advantageous to cause the loop 100 to converge as soon as practical. This value can be quantified so as to provide an effective operation. While there is not an absolute requirement for the loop 100 to converge within a specific time period, any losses attributable to a lengthy convergence can be traded off against losses from other causes. The convergence is effected in order to bring the gain to a point such that the receiver is not saturated by having the power level too high nor does it suffer from too much quantization so that the number of symbols that are potentially missed due to an incorrect AGC setting is minimized.

Some or all of the symbols received prior to AGC convergence can be used as inputs to the decoder, assuming that there is some information in those symbols. The other symbols can be discarded and are treated as erasures. One possible implementation of the present invention can be generally stated by the following steps:

1) A best estimate of the slot power may be derived prior to slot start based on past values of received power and interference. Alternatively, a fixed default for the slot power can be used.

2) The receiver gain is adjusted such that the power from step (1) brings the received signal to the appropriate level.

3) The power in several chips is measured. The measurements are corrected so that they properly account for non-linearities caused by saturation. Based on the measurements, the receiver gain is adjusted if necessary.

4) The symbols received while the receiver gain is adjusted are ignored and are not used to determine the received power.

5) Steps (3) and (4) are repeated until the signal is in the correct range or until some maximum number of iterations of the AGC loop have been performed.

According to one particular implementation of the invention as shown in FIG. 1A, in any given active time slot of a transmission, the AGC loop 100 will repeat for numIter iterations. It is to be noted that the embodiments shown in FIGS. 1A and 1B operate in an identical manner, with the exception being that the embodiment shown in FIG. 1B does not use the optional correction lookup table 108.

A single iteration of the AGC loop 100 is implemented by a series of operations. First, the accumulator 112 and the setting of the attenuator 102 are initialized. For the current setting of the attenuator 102, the ADC 104 samples the received signal. The power estimation block 106 skips the first $N_{skip}$ samples immediately following the update of the gain to prevent transients due to gain setting latency from impacting the power estimation. The value of $N_{skip}$ depends on the adjustment time of the radio gain control device and is implementation dependent.

The quantized complex samples $y_{qn}$ are fed to the power estimation block 106, which estimates the power at the ADC 104 output, using a number of $N_{samp}$ samples. By way of example, $N_{samp}$ can be set at 16 chips worth of samples. In general, $N_{samp}$ is selected to provide sufficient averaging for estimating the power, while keeping the total duration of the loop iteration ($N_{samp}+N_{skip}$) reasonably small. The $N_{skip}$ parameter is set according to the delay of the gain settling time of a particular attenuator 102. After skipping $N_{skip}$ samples, the power ($P_{est}$) is estimated using $N_{samp}$ samples, as shown below:

$$P_{est} = \frac{1}{N_{samp}} \cdot \sum_{n=1}^{N_{samp}} |y_{qn}|^2 \qquad \text{Equation (1)}$$

A correction lookup table (Correction LUT) 108 is used to correct non-linearities in the power estimate $P_{est}$. If the ADC 104 is clipping, then $P_{est}$ does not correctly estimate the power at the output of the ADC 104. As shown in FIG. 1A, the power estimate at the output of the correction LUT 108 is labeled P. If no correction LUT 108 is used (as shown in FIG. 1B), then $P=P_{est}$. Using the correction LUT 108 is optional; while it does provide an improvement, the AGC loop 100 can be implemented without it.

The estimated power (P) is compared to the desired reference level ($P_{ref}$) using a comparator 110, which outputs an error signal equal to the difference between the estimated power and the reference level. For implementation purposes, to alleviate the need for scaling with the $1/N_{samp}$ factor, the energy of the $N_{samp}$ samples can be calculated instead of the power, in which case the input of the comparator 110 needs to be scaled accordingly using $N_{samp} \cdot P_{ref}$. Also, to reduce the word sizes in the processor, the sum of magnitudes may be used instead of powers.

The comparator 110 may be implemented as a logarithmic comparator to linearize the output of the loop 100 in dB. The error signal at the comparator 110 output is given by:

$$pwrErr = 10 \cdot \log_{10}\left(\frac{P_{ref}}{P}\right) \qquad \text{Equation (2)}$$

While the comparator 110 is described as for linearizing the loop 100, it is noted that it is not necessary to linearize the loop 100. A linear loop is desirable because the behavior of a linear loop is the same, regardless of whether the error is positive or negative. Additionally, because the loop 100 is not a continuous control loop, linearity is not as important; even if the loop 100 functions better if it is linear, it would still be possible to design a non-linear version of the loop 100. Furthermore, the comparator 110 is described herein as a logarithmic comparator because the attenuator 102 is linear in decibels; i.e., it is modeled as a function of a power of 10.

The error signal of the comparator 110 is accumulated in the accumulator block 112 for the duration of the closed loop operation of the AGC loop 100 for number loop iterations. To initialize the gain at the beginning of the slot, it is necessary to store the accumulator values at the end of each slot. A memory area of fifteen words (not shown) is therefore required. The output of the accumulator 112 is used to drive a lookup table (LUT) 114 which provides the control word for the attenuator 102.

If the signal at the input of the ADC 104 is within the range of the ADC, then the AGC loop 100 converges to provide an average power $P_{ref}$ at the input of the ADC 104. If the signal at the input of the ADC 104 is out of range and the ADC 104 is clipping, then for each loop iteration, the gain is corrected by $P_{ADC\_Max}-P_{ref}$ dB, where $P_{ADC\_Max}$ is the maximum power supported at the input of the ADC 104. If $P_{in}$ is the actual received signal power at the AGC input, then the loop 100 converges to the desired $P_{ref}$ value after $$\frac{P_{in} - P_{ref}}{P_{ADC\_Max} - P_{ref}}$$

loop iterations.

Before the first iteration of the closed loop 100, the accumulator 112 and the attenuator 102 control words must be initialized. Two approaches may be used for the initialization: (1) use the value of the accumulator 112 calculated at the end of the same slot number in the previous frame (plus or minus an offset factor); or (2) use a small initial gain setting (or equivalently large attenuation) to prevent saturating the ADC 104 at the beginning of the slot. There are many other ways to base the initial settings on past values; for example, by using a recent path loss estimate to the serving cell.

Figure 2:
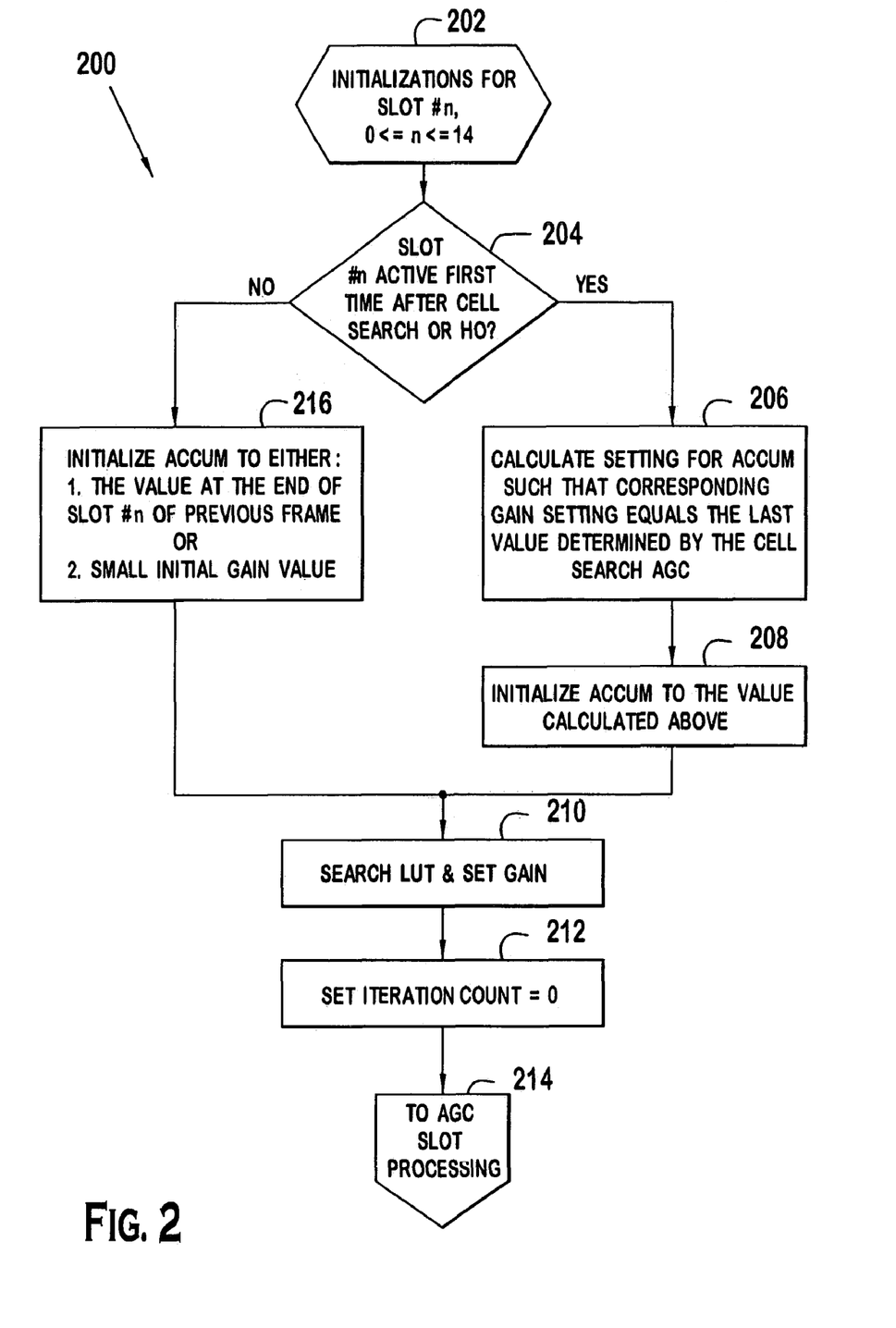
FIG. 2 is a flow chart of the operations performed during the initialization of the AGC shown in FIG. 1A at the beginning of each active slot.

FIG. 2 is a flow chart of the initialization phase 200 that is performed prior to the first iteration of the closed loop 160. The initialization phase 200 begins at step 202, which sets the slot number (n) of the slot to be processed. It is first determined whether slot n has been active in a previously received frame, or if it is the first time that slot n is active after a cell search or a handover (step 204). If this initialization phase is the first time that slot n is active, a setting for the accumulator is calculated such that the gain setting equals the last value determined by the cell search AGC (step 206). The accumulator is then initialized to this calculated value (step 208).

The value of the accumulator is used to search a lookup table for a control word for the attenuator, which is used to set the gain (step 210). Lastly, the iteration counter is set to zero (step 212), and control is passed to the AGC loop for processing the signal in slot n (step 214).

If, in step 204, it has been determined that slot n has previously been active, the accumulator is initialized to either the value of the same slot n in a previous frame or to a small initial value (step 216). By way of example, a range for the initial value can be 12 to 24 dB above the minimum gain that the attenuator can provide, with a preferred value being 18 dB above the minimum gain. Control then passes to step 210 and proceeds as described above. Once the initialization stage is complete, the processing continues with the closed loop operation.

Figure 3:
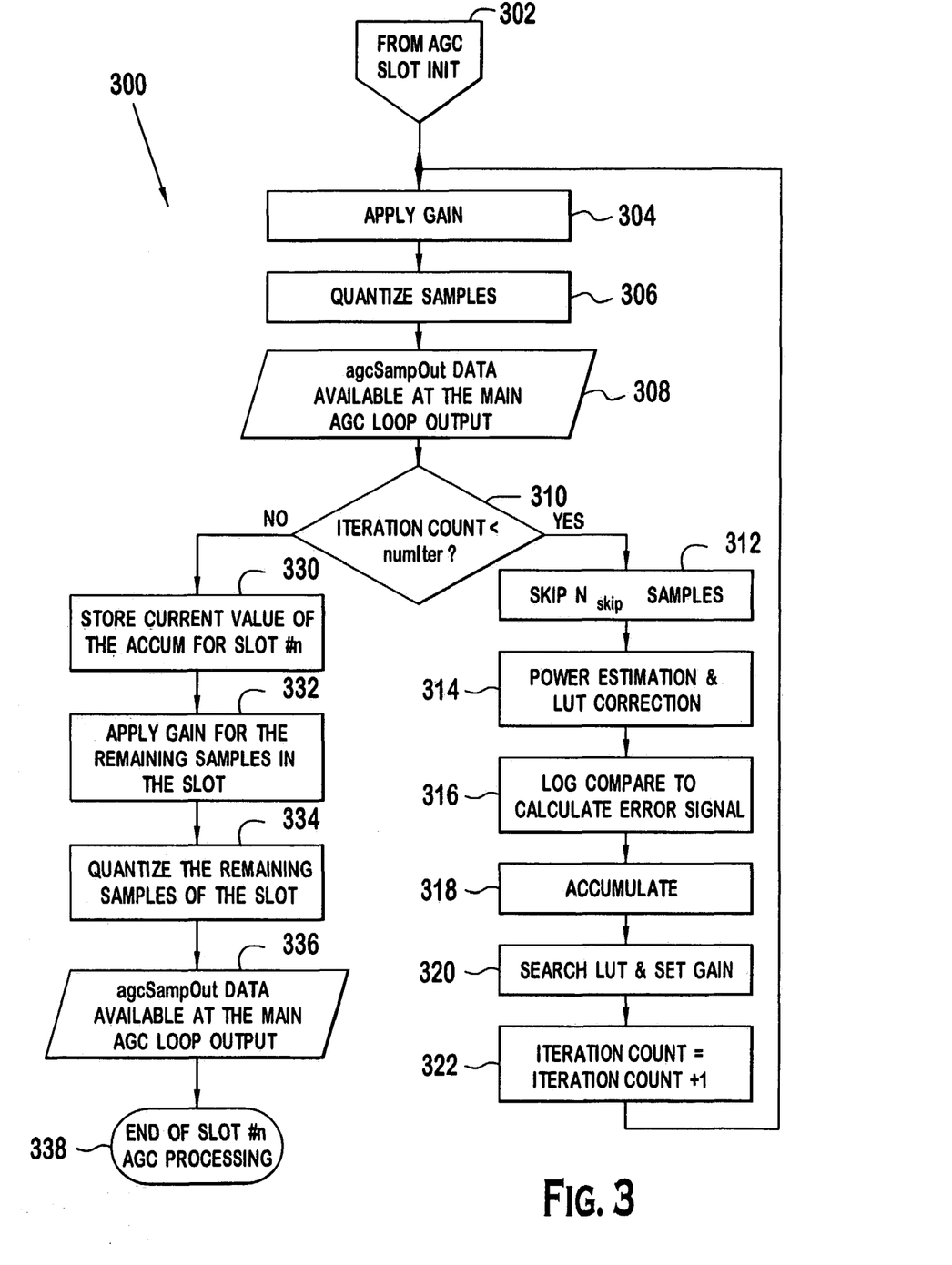
FIG. 3 is a flow chart of the operations performed during the processing of a slot in the AGC shown in FIG. 1A.

Referring now to FIG. 3, a flow chart of the steps of the AGC loop 300 is shown. The loop 300 begins at block 302, where control is assumed from the initialization phase. The gain is set (step 304) based upon the initialized value. At the current attenuator setting, the ADC samples the received signal and quantizes the samples (step 306). The quantized samples are then sent both to the remainder of the AGC loop and out of the AGC loop to be further processed by the WTRU (step 308).

A check is made to determine whether the desired number of iterations through the loop have been completed (step 310) by comparing the current iteration count to number, a predetermined value. If the number of the current iteration is under the limit, then control is passed to step 312 where $N_{skip}$ samples are passed over without analysis to prevent transients due to latency in adjusting the gain. After the $N_{skip}$ number of samples have been ignored, the power of the next sample is estimated (step 314). If the ADC is clipping, then the power estimate will not be accurate and a lookup table may be used to correct the power estimate. If this step is necessary, it will be performed in connection with step 314 as previously described.

Next, the estimated power is compared to a reference power level using a log comparator, and an error signal is generated based upon the difference between the estimated power level and the reference power level (step 316). The error signal is captured by the accumulator (step 318), and the value of the accumulator is used to access a lookup table to determine the control word for the attenuator, which is used to set the gain (step 320). The iteration counter is increased by one (step 322), the newly set gain is applied (step 304), and the loop 300 repeats as described above.

If the iteration counter has exceeded the limit, control passes to step 330, where the current value of the accumulator for the current slot (slot n) is stored for later use during the initialization phase (see discussion in connection with FIG. 2, step 216). The gain that has previously set is applied for the remaining samples in the slot (step 332). The ADC quantizes the remaining samples in the slot (step 334) and outputs the quantized samples to be further processed by the WTRU (step 336). After the last sample in the current slot has been output by the ADC, the AGC loop for the current slot terminates (block 338).

Figure 4:
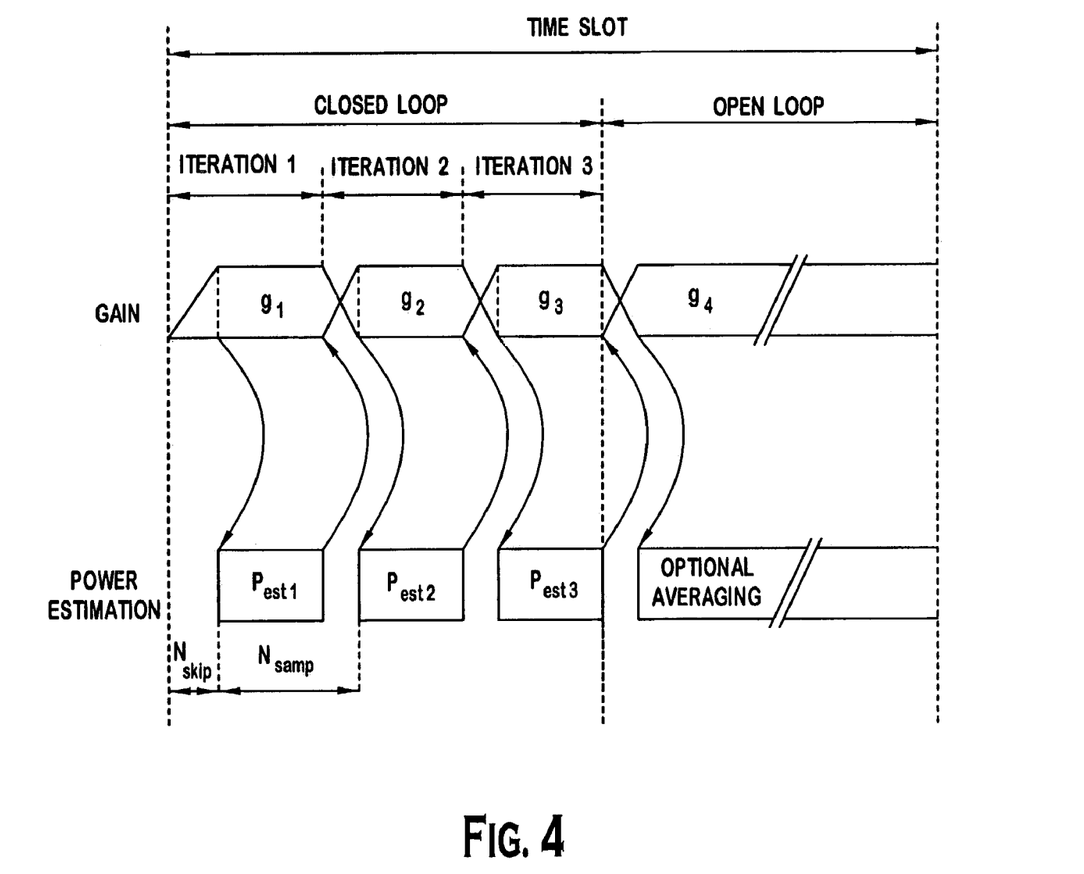
FIG. 4 is a timing diagram for the AGC processing.

In the timing diagram shown in FIG. 4, it is assumed that the processing time required for the log-compare, accumulate, and map to attenuator control word steps is negligible, and therefore is not shown. Still referring to FIG. 4, $P_{est(n)}$ is the estimated power during a particular iteration (n), $g_1$ is the gain computed from the estimated power of the timeslot in the previous frame, and $g_{n+1}$ is the gain computed for a particular $P_{est(n)}$. $N_{skip}$ and $N_{samp}$ are the number of samples to skip at the beginning of a timeslot and the number of samples used to estimate $P_{est(n)}$, respectively.

After running number iterations of the closed loop process, the loop is opened and the gain value calculated during the last closed loop iteration is applied to the rest of the time slot. To improve the accuracy of the initial gain setting for the same slot number of the next frame, one can continue to calculate the error signal and filter it, but without actually updating the attenuator value. By continuing to calculate the error signal during the open loop period shown in FIG. 4, a more recent value of the last estimated error may be used as an initial gain setting for the subsequent timeslot. Because it is more recent, there is less time between updates of the gain. This is not always the case, however. The measurement at the end of the slot may be useful for another slot if it immediately follows; otherwise the information may be discarded.

While specific embodiments of the present invention have been shown and described, many modifications and variations could be made by one skilled in the art without departing from the spirit and scope of the invention. The above description serves to illustrate and not limit the particular invention in any way. The present invention is applicable to all slotted access methods, in both the mobile unit (i.e., WTRUS) and the base station. However, in some cases using the AGC loop 100 may be an overkill, such as if the slot-to-slot variations are small or if the data part of the communication burst is preceded by a suitable preamble.

While the foregoing discussion of a preferred embodiment of the present invention has been described in connection with a TDD or TD-SCDMA system, the AGC loop of the present invention is equally applicable to any setting in which an AGC loop may be used.

What is claimed is:

1. A method for automatic gain control for a wireless transmit and receive unit (WTRU) in a time-slotted communications system, the WTRU receiving a signal, the method comprising the steps of:

(a) initializing an automatic gain control loop including:
   initializing an accumulator; and
   setting a gain of an attenuator;
(b) sampling the received signal with an analog-to-digital converter (ADC);
(c) estimating the power of the received signal;
(d) comparing the estimated power of the received signal with a reference power level;
(e) generating an error signal based upon the difference between the estimated power and the reference power level;
(f) accumulating the error signals generated by a plurality of received signals in the accumulator;
(g) looking up the accumulator value in a table to locate a control word for the attenuator;
(h) passing the control word to the attenuator to adjust the gain; and
(i) repeating steps (c) through (h) for a predetermined number of iterations.

2. The method according to claim 1, wherein the initializing step further includes the step of determining whether the current slot has previously been active prior to initializing the accumulator, if the current slot has previously been active then the accumulator is initialized to a first value, and if the current slot has not previously been active then the accumulator is initialized to a second value.

3. The method according to claim 2, wherein the first value equals the value of the accumulator at the end of the same slot from a previous frame.

4. The method according to claim 2, wherein the first value is set to a small initial value.

5. The method according to claim 4, wherein the small initial value is in the range of 12–24 dB above the minimum gain setting of the attenuator.

6. The method according to claim 2, wherein the second value equals the last value of the gain setting determined by a cell search automatic gain control.

7. The method according to claim 1, wherein the setting step includes searching a second lookup table with the value of the accumulator to find a second control word for the attenuator.

8. The method according to claim 1, wherein the estimating step includes skipping the first few samples immediately following the gain adjustment.

9. The method according to claim 1, wherein the estimating step includes using a third lookup table to correct the estimate if the ADC is clipping.

10. The method according to claim 1, wherein the comparing step includes using a log comparator.

11. The method according to claim 1, further comprising the steps of:
   (j) storing the accumulator value for the current slot in a memory; and
   (k) applying the previously set gain for the remainder of the slot.

12. A receiver having an automatic gain control, said receiver for use in a time-slotted communications system, comprising:
   initializing means for initializing an automatic gain control loop including:
      a second initializing means for initializing an accumulating means; and
      setting means for setting a gain of an attenuator;
   sampling means for sampling a received signal;
   estimating means for estimating the power of the received signal;
   comparison means for comparing the estimated power of the received signal with a reference power level;
   generating means for generating an error signal based upon the difference between the estimated power and the reference power level;
   said accumulating means for accumulating the error signals generated by a plurality of received signals, said accumulating means storing an accumulated value; and
   lookup means for looking up the accumulated value in a table to locate a control word for said attenuator, said control word used to adjust the gain of said attenuator.

13. A receiver according to claim 12, wherein said setting means includes second lookup means for looking up the initial value in a second table to locate a second control word for said attenuator, said second control word used to adjust the gain of said attenuator.

14. A receiver according to claim 12, wherein
   said sampling means includes an analog-to-digital converter (ADC); and
   said estimating means includes third lookup means for looking up a correction factor if said ADC is clipping.

15. A receiver according to claim 12, wherein said comparison means includes a log comparator.

16. A receiver according claim 12, wherein said accumulating means includes an accumulator.

17. A receiver according to claim 12, further comprising storing means for storing the accumulated value.

18. A receiver according to claim 17, wherein said storing means includes a memory.

19. A receiver for use in a time-slotted communications system, comprising:
   an automatic gain control loop;
   an initializer for initializing said automatic gain control loop, wherein said initializer includes
      a second initializer for initializing an accumulator with an initial value; and
      a setting device for setting a gain of an attenuator;
   a sampler for sampling a received signal;
   an estimator for estimating the power of the received signal;
   a comparator for comparing the estimated power of the received signal with a reference power level;
   a generator for generating an error signal based upon the difference between the estimated power and the reference power level;
   said accumulator for accumulating the error signals generated by a plurality of received signals, said accumulator storing an accumulated value; and
   a lookup device for looking up the accumulated value in a table to locate a control word for said attenuator, said control word used to adjust the gain of said attenuator.

20. A receiver according to claim 19, wherein said setting device includes a second lookup device for looking up the initial value in a second table to locate a second control word for said attenuator, said second control word used to adjust the gain of said attenuator.

21. A receiver according to claim 19, wherein
   said sampler includes an analog-to-digital converter (ADC); and
   said estimator includes a third lookup device for looking up a correction factor if said ADC is clipping.

22. A receiver according to claim 19, wherein said comparator is a log comparator.

23. A receiver according to claim 19, further comprising a memory for storing the accumulated value.

* * * * *

UNITED STATES PATENT AND TRADEMARK OFFICE
CERTIFICATE OF CORRECTION

PATENT NO. : 7,197,289 B2
APPLICATION NO. : 10/613463
DATED : March 27, 2007
INVENTOR(S) : Zeira et al.

It is certified that error appears in the above-identified patent and that said Letters Patent is hereby corrected as shown below:

ON THE TITLE PAGE

At Item (54), Title, page 1, left column, line 2, after the words "UNIT IN", delete "A".

IN THE SPECIFICATION

At column 1, line 2, after the words "UNIT IN", delete "A".

At column 1, line 40, after the word "status", delete " ' ".

At column 5, line 20, after the word "loop", delete "160" and insert therefor --100--.

At column 6, line 15, after the word "previously", insert --been--.

At column 6, line 54, after the word "unit", delete "(i.e., WTRUS)" and insert therefor --(i.e., WTRUs)--.

Signed and Sealed this

Twenty-fifth Day of September, 2007

JON W. DUDAS
*Director of the United States Patent and Trademark Office*